United States Patent [19]
Varley et al.

[11] Patent Number: 5,313,393
[45] Date of Patent: May 17, 1994

[54] INVENTORY CONTROL SYSTEM FOR AUTOMATIC DISPENSING

[76] Inventors: Clem Varley, Heathersett, 110 Gregories Road, Beaconsfield, Bucks HP 9 1HN; John A. Varley, Forester, Lower Church Street, Stokenchurch, Bucks; Richard P. Varley, 19 Blossom Chase, Ealing, London W.5., all of England

[21] Appl. No.: 895,372

[22] Filed: Jun. 10, 1992

[51] Int. Cl.$^5$ .............................................. G06F 15/00
[52] U.S. Cl. ...................... 364/403; 221/76; 221/185; 222/143; 194/205
[58] Field of Search ............... 364/403, 408, 479; 194/205; 235/381, 383, 385; 221/76, 185; 222/143, 144; 369/37

[56] References Cited

U.S. PATENT DOCUMENTS

| | | | |
|---|---|---|---|
| 4,391,388 | 7/1983 | Krakauer | 221/76 |
| 4,498,603 | 2/1985 | Wittenborg | 221/76 |
| 4,754,126 | 6/1988 | Caldwell | 235/379 |
| 4,814,592 | 3/1989 | Bradt et al. | 235/381 |
| 4,967,928 | 11/1990 | Carter | 221/2 |
| 4,991,008 | 2/1991 | Nama | 358/108 |
| 5,028,766 | 7/1991 | Shah | 235/381 |
| 5,042,686 | 8/1991 | Stucki | 221/13 |
| 5,088,586 | 2/1992 | Isobe et al. | 194/205 |
| 5,113,351 | 5/1992 | Bostic | 364/479 |

OTHER PUBLICATIONS

Co-pending U.S. application Ser. No. 07/718,482.

Primary Examiner—Roy N. Envall, Jr.
Assistant Examiner—Khai Tran
Attorney, Agent, or Firm—Pollock, Vande Sande & Priddy

[57] ABSTRACT

Apparatus for controlling dissemination of garments. First and second rotatable cassettes are provided, one of which is used to store clean garments, the other of which serves as a depository for soiled garments. Each of the rotatable cassettes has an access door which permits access to a shelf segment of each cassette. A processor is provided which will generate first and second actuating signals for unlocking the doors of the cassette. An actuating signal is generated by the processor when a card reader recognizes a user access card, and determines tht the user's account status is in order. Each time a deposit is received, or a clean garment dispensed, the user's account status is brought up to date, reflecting the transaction. Thus, users who have not returned garments, and have too many account debits may not receive a new garment.

7 Claims, 18 Drawing Sheets

INVENTORY CONTROL SYSTEM FOR AUTOMATIC DISPENSING

RELATED APPLICATIONS

This application is related to co-pending U.S. patent application Ser. No. 07/718,487 filed Jun. 24, 1991.

TECHNICAL FIELD

The invention relates to an apparatus and method for automatically dispensing material without human intervention, particularly garments worn or used in controlled environments.

BACKGROUND OF THE INVENTION

There are a variety of industries and care facilities including hospitals and manufacturers of pharmaceutical and computer chips which require automatic garment or material dispensing systems. Specifically, they require an automatic dispensing system which permits an authorized user to obtain clean garments, as well as monitoring the dissemination of such garments, and which exchange soiled garments therefor.

To illustrate, hospitals generally require that doctors, nurses and assistants wear garments and scrub suits meeting specific cleanliness requirements. These requirements may dictate that the garments be changed and/or washed a number of times in the course of a 24 hour period. In addition, certain manufacturing industries also require garment specifications, particularly in the manufacture of pharmaceutical and computer chips. A particular clean room, for example, may require garments be cleaned to remove particles of 50, 100 or even 200 microns. These requirements present inventory control concerns in that first, specific garments must be issued to specific users and second, that a user can only enter a clean room once he has checked out the appropriate garment.

Traditionally, garments were simply folded and placed on laundry carts accessible to various users; or the carts were transported to an area, for example an operating room, locker room or scrub room, where the user could readily acquire a clean (or new) garment and discard the old garment. Such inventory control systems relied on an honor system which has proven unreliable in that some users often take multiple clean garments and fail to return the used or soiled garment; this results in economic hardships for the facility. Experience has shown that, on the average for every 100 sets of issued scrub wear, only 95 are returned constituting an approximate 5% daily loss in scrub wear garments or an annual loss for some institutions exceeding $100,000.00.

Since many facilities must have an inventory system but cannot justify the costs associated with honor systems, there is a need for a more controllable system. The system must be capable of issuing a specific garment to a specific user, monitoring if that particular user returns the garment either prior to picking up a clean garment or by a specific time designated by the system and, where different garments are required for different areas, that the user has checked out the appropriate garment prior to entering a controlled area.

Complicating the situation even further is that many hospitals (or other facilities) have often encountered growth rates ahead of their anticipated growth at the time of construction. It therefore becomes exceedingly difficult to designate appropriate and sufficient space to maintain a garment distribution system or center at a convenient location. Hence, it becomes important to have garment inventory control systems compact, convenient, easy to operate and inexpensive to maintain, load and relocate.

Automated inventory control systems are available in the industry. These systems dispense clean garments to authorized users who have been issued magnetic cards, or tokens, identifying these users to a dispensing machine as being authorized to receive one or more garments. These systems are most applicable in hospitals, wherein large quantities of scrub wear are routinely used and returned by hospital personnel for an exchange of clean scrub wear. However, such systems have generally been large, expensive and difficult to relocate.

Inventory control of scrub wear is further complicated by the fact that often garments cannot be marked to personalize them to individual users or, in some cases, the same hospital. Frequently, a hospital's central laundry vendor merely returns similar but not the same scrub wear.

Thus, any improvement in automatic inventory control systems which automatically dispense reusable garments, must necessarily efficiently process and credit the user for garments dispensed and returned without complete reliance on indicia-indicating tags or optically-read information on garments which deteriorates over the useful life of the garment.

SUMMARY OF THE INVENTION

It is an object of this invention to provide an inventory control system with automatic garment dispensing and depositing machines. These and other objects of the invention are provided by an apparatus and method which dispenses garments to specific users issuing a debit or credit to a valid user depending on whether the particular machine is for dispensing new or clean garments or for depositing used or soiled garments.

It is a specific object of this invention to provide a system which is compact and mobile and capable of dispensing a specific garment to an identified user, and in a second embodiment of the invention, of crediting a user for the return of used garments preferably prior to dispensing clean garments. This invention also provides for the centralizing of a data processing center wherein individual dispensing and depositing machines in different locations of a facility can be monitored to trace an individual user's access to materials contained in the machines. Various embodiments of the invention can also combine debits and credits to the same machine, or through the use of a central processing center, debits and credits at different machines in the same and different areas of a given facility. In other words, these debits and credits can be balancing through a variety of machines located in different areas of the same facility thereby monitoring an individual user's garment usage.

In accordance with a preferred embodiment of the invention, a system for inventorying dispensed and deposited garments is provided wherein an enclosure containing the clean, new or soiled garment is accessible to a user upon the user inserting a proper ID card and the card being validated. A processor reads the magnetic card (or other indicia-bearing media issued to the user) and thereby validates the same. In some applications the ID card will record credits and debits or, alternatively, the microprocessor will insure that the user does not exceed a limited number of debits. Once validated, the user is then provided with various menu screens and/or selection buttons. He enters the requested information and is then permitted to obtain a new or clean garment or return a soiled garment. A transaction record is made each time a user removes or returns a garment and the record is stored in memory. This memory can be checked periodically at an individual machine or connected to a central processing center via a modem for maintaining an up-to-date inventory status of downloaded recorded transactions.

According to the preferred embodiment, the user, once a transaction has been validated, is directed to a particular user access door to remove a garment. Accordingly, a locking mechanism releases a user access door(s) wherein the user can pull open one of a plurality of user access doors and remove a garment. In operation, the pulling open of the user access door, in a non-motorized embodiment of the invention, rotates the individual shelf to position the next garment compartment in a series, hence, a user actually replaces or removes a garment from the compartment that is next in series to the compartment visible through a transparent user access door. A locking mechanism subsequently limits rotation of the cassette shelf exposing only one garment compartment to a single user.

Each record is identified not only by the user ID but also by identifying each debit and credit by a specific time and date. Thus, any dispensing or returning of garments is documented and identified by the appropriate transaction indicia.

According to another embodiment of the invention, the inventory control apparatus is motorized and contains a series of sensors identifying a particular shelf and compartment to a microprocessor. Accordingly, when a user wishes to access a particular garment, he engages in an interface routine with the machine whereby the machine determines on which shelf and compartment of the cassette the garment of his choice is located. Using the sensors, an electric motor and a clutch means, the microprocessor, sending the appropriate signals, enables the electric motor to rotate the cassette and shelves and releases the proper user access door thereby allowing the user to retrieve or deposit a specific garment. This embodiment would require electronic sensors, motor and clutch and a monitoring system to insure that the microprocessor recognizes which compartments contain garments which are clean or new and which compartments contain garments which are soiled, and further which compartments contain no garments whatsoever. These and other objects of the present invention will become apparent from the detailed description below in combination with other embodiments that may be apparent to those skilled in the art having a use for such an inventory control apparatus.

DESCRIPTION OF THE PREFERRED EMBODIMENT

Figure 1:
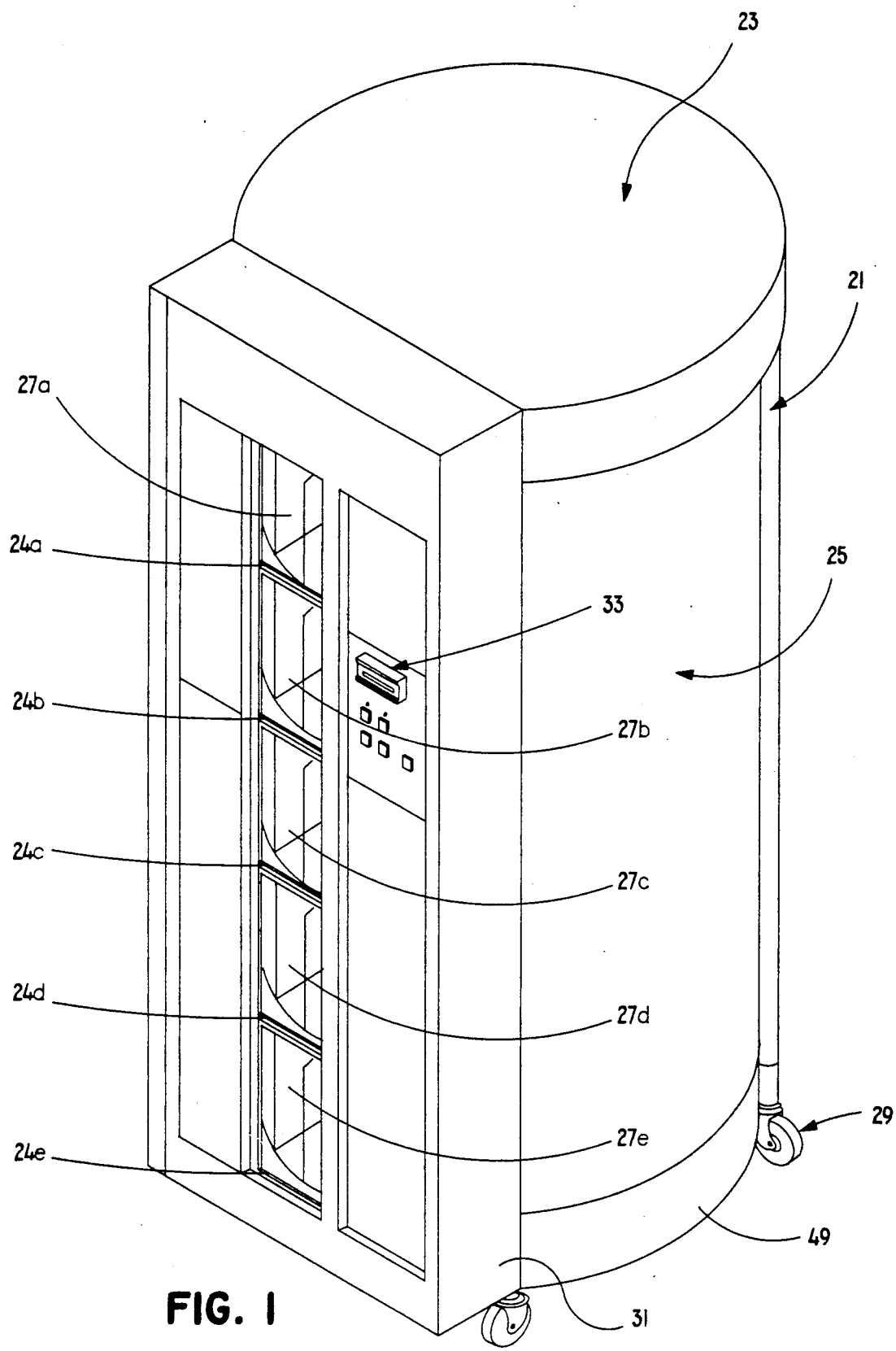
FIG. 1 is a plan view of an apparatus for inventory dispensing and receiving of garments to and from authorized users.

Referring now to FIGS. 1-3 and 16, there is shown a single cassette apparatus of a preferred embodiment of the present invention. The apparatus shown in FIG. 1 comprises a frame 21 supporting both an upper enclosure 23 and a side enclosure 25. Enclosures 23,25 create a secured compartment for housing a semipermanent cassette 39 in which individual rotatable shelves 24a, b, c, d and e having garment compartments 27a, b, c, d and e are contained. A user wishing to obtain a garment from a specific garment compartment 27 could insert, preferably, a magnetic strip card into card slot of card reader 33. Once the card has been validated the user has access to one of a plurality of compartments 27a, b, c, d and e. To practice this invention it is not necessary that the user be limited to just one compartment, but for purposed of limiting garments issued to a given user it is preferred.

Figure 4:
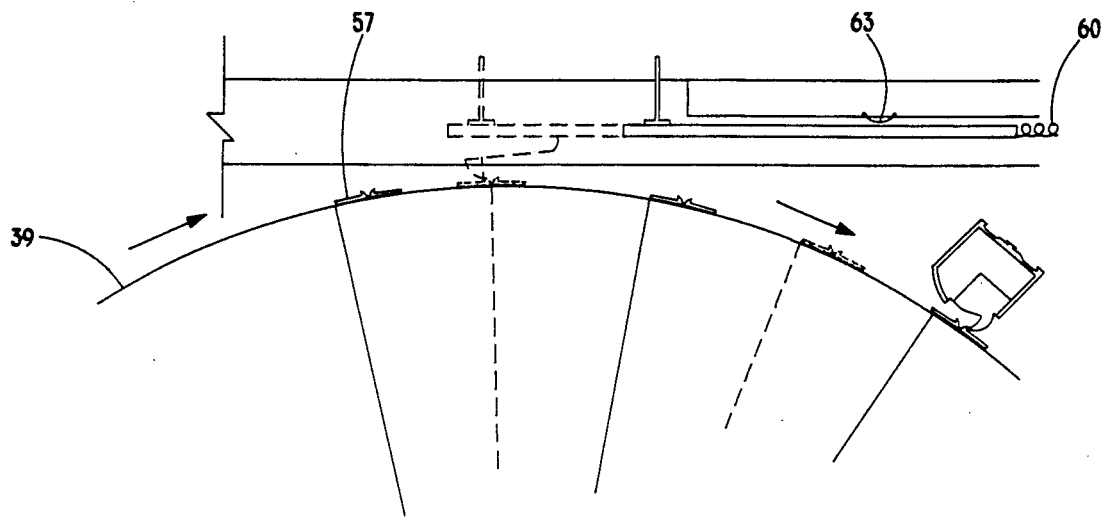
FIG. 4 is a sectional view of one level of the inventory control cassette showing the user access door open and the microswitch closed.
Figure 5:
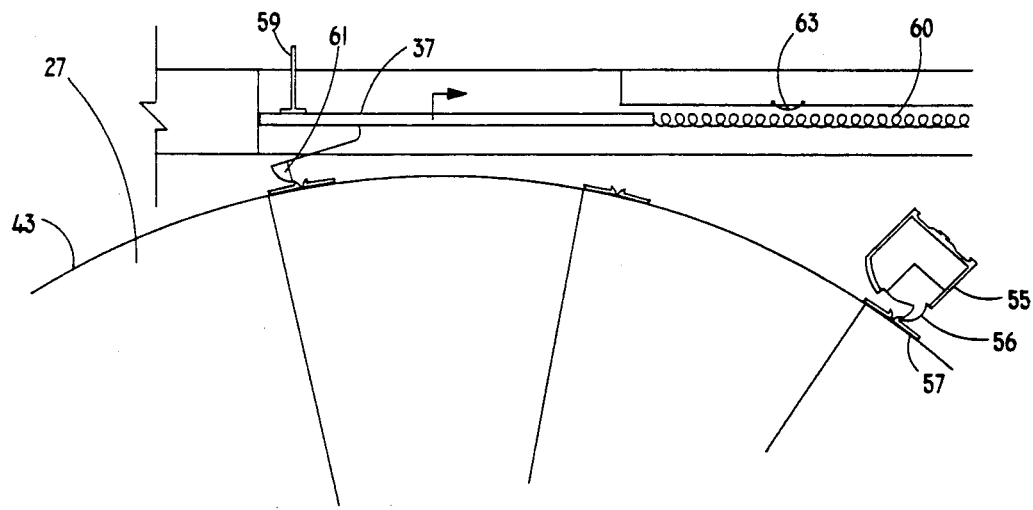
FIG. 5 is a sectional view of one level of the inventory control cassette showing the user access door closed and the microswitch open.

Once a user has been validated a locking mechanism, shown in FIGS. 4 and 5, acts to limit rotation of the individual shelves 24a, b, c, d and e of cassette 39. Upon validation of a user's ID card and a menu selection, locking solenoid 55 retracts solenoid locking pin 56 from cassette latch pin 57 allowing an individual cassette shelf 24a, b, c, d, or e to rotate. Once released, cassette shelf 24a, b, c, d or e can be rotated depending on the users selection to the next compartment in series on cassette shelf 24a, b, c, d or e. Rotation occurs by the user pulling on handle 59 wherein user access door latch 61 rotates cassette shelf 27a, b, c, d or e to expose the next compartment in series or the next compartment with respect to the compartment immediately visible through the transparent user access door 37a, b, c, d or e. Once the user has pulled the user access door 37a, b, c, d or e open, a compartment 27a, b, c, d or e is exposed and he is free to remove a specific garment (not shown) or replace a garment depending on the use of the apparatus. In operation, when the cassette latch pin 57 has passed locking solenoid 55 and solenoid locking pin 56, locking solenoid releases solenoid locking pin 56 to catch on the next cassette latch pin 57 in series around the periphery of the cassette. This is accomplished with micro-switches 63. After the user has released user access door 37, user access door returns to its original position and user access door latch 61 locks behind the next cassette latch pin in series around the periphery of the cassette 42. Hence, the shelf 37a, b, c, d or e has been rotated part of a turn and is again secured between locking solenoid pin 56 and user access door latch 61 and ready for the next user.

In operation, there is provided a series of micro-switches 63 which operate in conjunction with the opening and closing of each user access door 37. After a user has been validated and made his various selections through user interface panel 41, and the solenoid locking pin 56 has been retracted, the user will begin to open user access door 37. User access door 37 and rotation of a cassette shelf 24a, b, c, or d via user access door latch 61 are coordinated such that user access door 37 will close microswitch 63 which, in turn, causes locking solenoid to release locking solenoid pin 56. As user access door 37 is opened further, shelf 24a, b, c, d, or e of cassette 39 will continue its rotation until the next cassette latch pin 57 in series comes in contact with solenoid locking pin 56. Accordingly, the rotation of shelf 24a, b, c, or d is terminated and the user has complete access to a garment compartment 27a, b, c, or d wherein he can remove the garment of his choice. Once he has removed his garment and released handle 59, user access door 37 is forced back into its closed position with a spring means 60. The inventory control apparatus is then ready for the next user.

Figure 2:
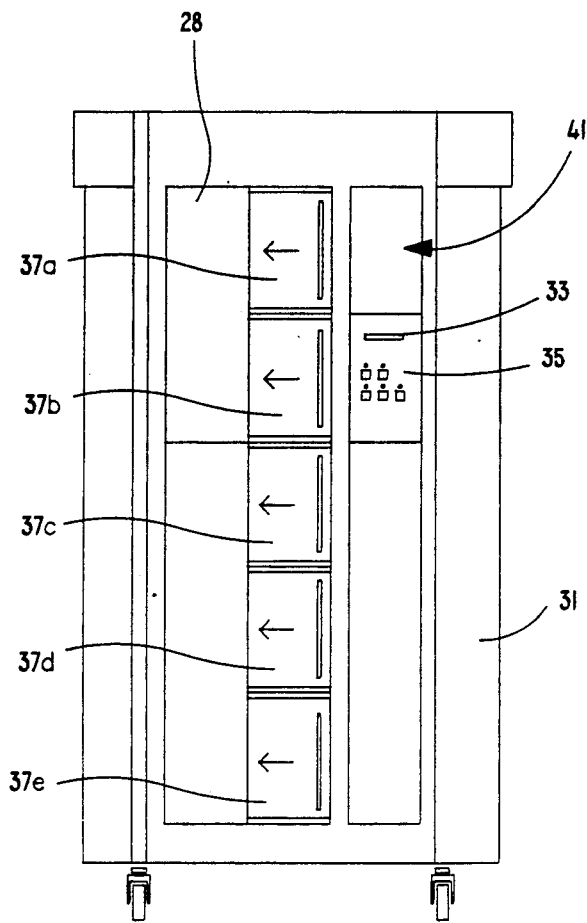
FIG. 2 is a front view of FIG. 1 showing that portion of the apparatus designed for user-interface and removal of material.
Figure 3:
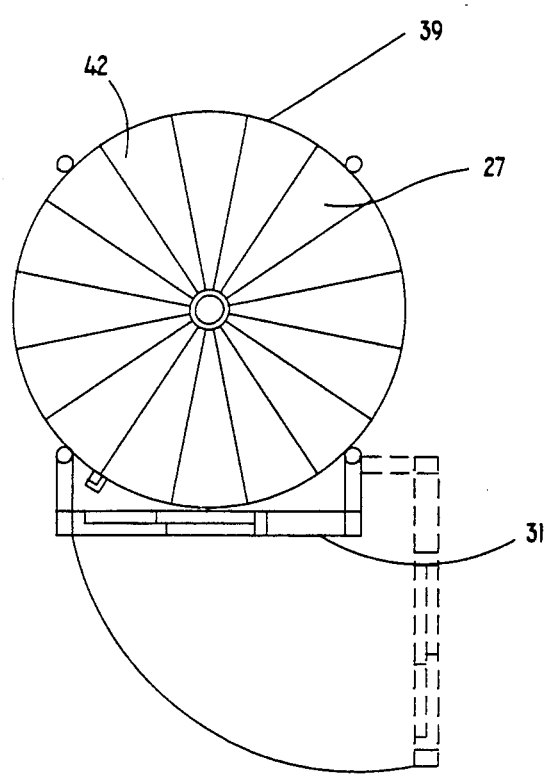
FIG. 3 is a top view of FIG. 1 partially in section showing the main access door both in the open and closed positions.

A main access door 31 shown in FIG. 2 contains the individual user access doors 37a, b, c, d, and e and the electronics necessary for interfacing with the user. The main access door 31, as shown in FIG. 3, opens as a unit with the user access doors 37a, b, c, d and e contained therein. This exposes a larger portion of cassette 39. Door 31, in the open position, allows for easy removal and installation of clean and/or soiled garments. This door is preferably locked in position by a conventional lock and key association (not shown) wherein only certain individuals, assumably those in charge of reloading or exchanging the entire material content of the cassette 39, will have access to the lock and key.

The electronics contained in the main access door 31 would include, but not be limited to, electronic card reader 33 which accepts and validates the chosen form of interface between the dispensing apparatus and the user; preferably a magnetic strip card is inserted into the card slot of card reader 33 and is validated. Also included in main access door 31 is a microprocessor with a memory capacity for storing the identification numbers of authorized users including, but again not limited to, the date, time, ID number, and specific compartments accessed and information relating to the contents of the various compartments 27a, b, c, d, and e. The memory of the microprocessor can be updated to include new users, and to remove users who are no longer authorized to obtain garments from the apparatus. Access to the microprocessor memory can be through a R 232 connection and a modem from a central processor or via a keypad located in a secure location in the machine which may be for example on the inside of the main user access door 31 or through the keypad common to all users but with a different password or ID number. In the preferred embodiment the electronics are located in main access door 31 however, those skilled in the art could readily place the electronics at other locations in or on the dispensing apparatus or even locate them remotely from the unit. In addition, to practice this invention, it is not necessary that the main access door 31 be electrical in operation. It may be necessary to have a substantially mechanically operated door when the apparatus is located in an environment where electronics would not function properly, specifically outdoors.

Once the user has been validated the user is then presented with a menu selection on display 41. The user responds to the menu selection with a keypad wherein once he has entered his selection, he can then access a garment compartment 27a, b, c, d or e through slidable user access door 37a, b, c, d or e and remove the appropriate garment. The entire apparatus as shown in FIG. 1 is mounted on rollers or swivel wheels 29 for moving the cart to locations suitable for garment control. In a preferred embodiment, the overall dimensions of the inventory control apparatus are kept under (or within) 3-feet to permit the unit to easily pass through doorways and to occupy a minimal amount of floor space when in use.

The display 41 which may be a CRT or alphanumeric display incorporated into the main access door 31, provides menu selections permitting the user to either return a soiled garment or receive a clean garment by following the various menu instructions. These menus direct the user in selecting the type and size of garment he wishes to receive thereby specifying the user access door 37a, b, c, d or e and compartment 27a, b, c, d or e where the garment is located. The information relating to this transaction is stored in memory under the user's identification number. Subsequent requests are monitored in the same way.

Figure 16:
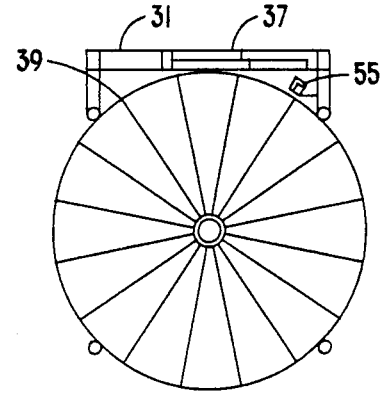
FIG. 16 is a top view of FIG. 1 with the cassette locking mechanisms in place.

In FIGS. 3 and 16 there is shown the inventory control apparatus of FIG. 1 wherein the door 31 can be opened to remove or install fresh or soiled garments in the cassette 39. As shown in FIGS. 1, 2, 3 and 16 this particular apparatus is designed to allow ease of mobility customarily found in conventional wire laundry carts, but with the security of a much larger and more sophisticated machines.

Using two machines similar to that shown in FIG. 1, a user can deposit a soiled garment into one machine and receive a credit on his magnetic card and subsequently receive a new or fresh garment from a like or similar machine and thereby receive a debit on the same card. The processor associated with the inventory control apparatuses throughout the facility can communicate with a central computer system thereby noting that a user obtained or deposited a specific garment at a specific location within the facility or each machine could be self-contained in that all transaction data and memory updating is contained within a single machine. The transaction would be automatically entered into a central computing system (not shown).

Figure 6:
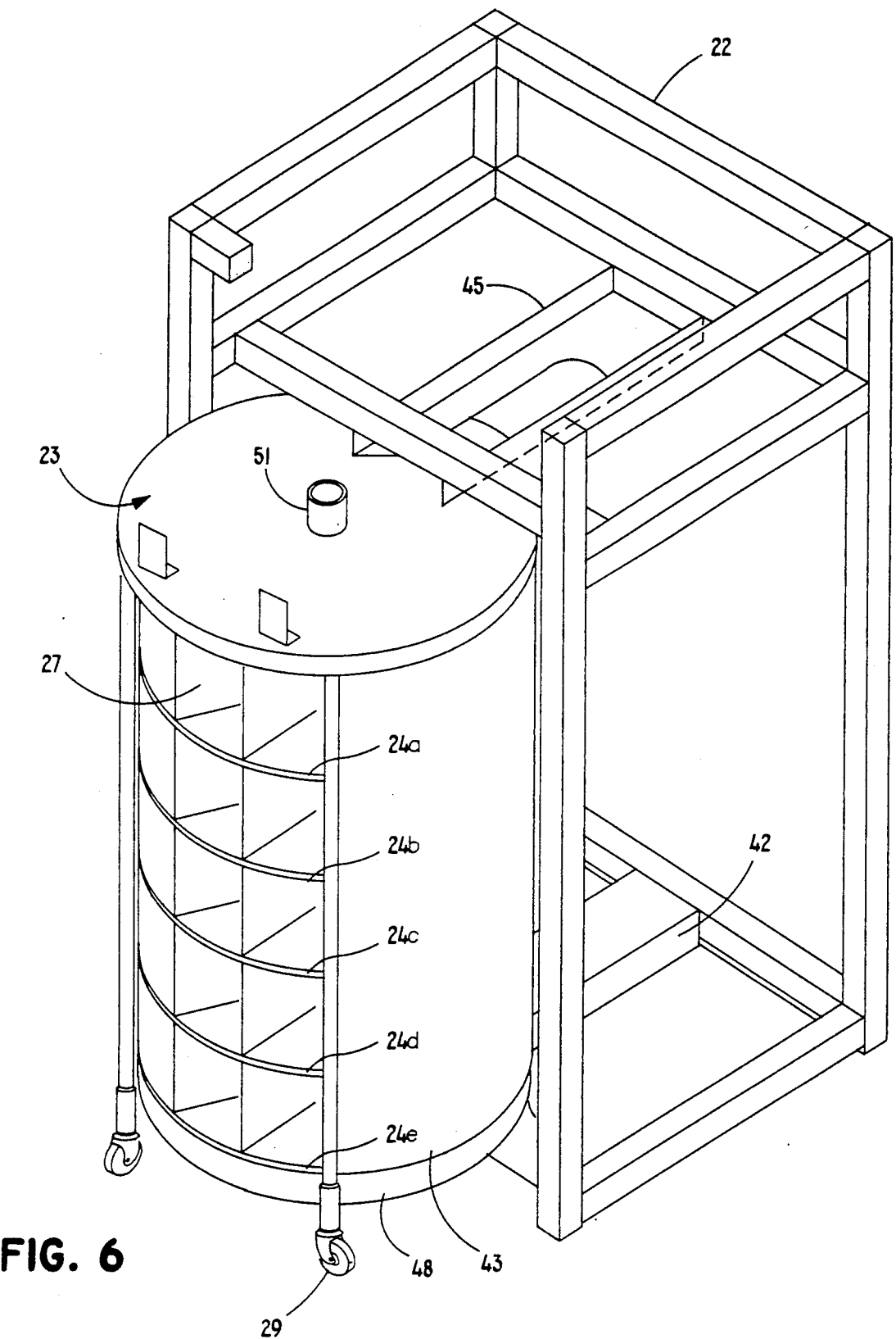
FIG. 6 is a plan view partially in section showing a second embodiment of the present invention for dispensing and receiving materials to and from authorized users.

Referring now to FIGS. 6–8 and 15 there is shown a second embodiment of the present invention. This embodiment also comprises a frame 22, however frame 22 is intended to provide a more rigid and permanent support for a cassette 43 receiving station. Frame 22 has both an upper guide 45 and a lower guide 47 for cooperating with upper cassette guide pin 51 and lower cassette guide pin (not shown) of removable cassette 43. As in the previous embodiment shown in FIG. 1, the frame 22 of FIG. 6 is provided with enclosures (not shown) to secure the contents of the apparatus.

Removable cassette 43 is attached to a base 48 and the base is further mounted on swivel wheels 29. The removable cassette 43, similar to the apparatus shown in FIG. 1 but without main access door 31, contains the various compartments 27a, b, c, d and e and is housed in a separate frame similar to frame 21 shown in FIG. 1. Removable cassette 43 is designed to be readily removable from the interior of the receiving station and small enough to be easily movable between the receiving station and the laundry room.

In operation, removable cassette 43 can be one of several cassettes, part of a continuous loop of: 1) loading the garments into the cassette 43 in the laundry room, 2) transporting the cassette 43 to a dispensing machine and/or 3) dispensing garments to the end users. In other words, the cassette 43 can be efficiently taken to the laundry room or preparation area and loaded with clean garments and returned or exchanged for an empty or partially empty cassette 43 in the receiving station.

Figure 7:
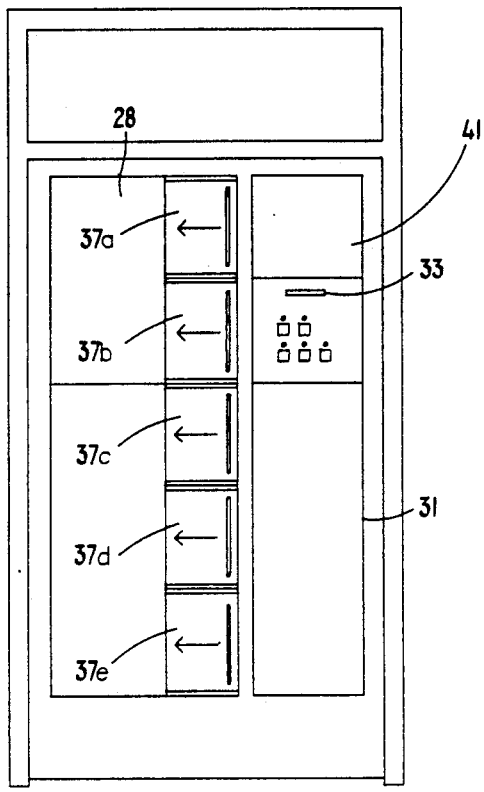
FIG. 7 is a front view of FIG. 6 showing that portion of the apparatus designed for user-interface and removal or replacement of materials.

FIG. 7 is a front view of the main access door 31 containing the magnetic card reader 33, user interface panel 41 and user access doors 37a, b, c, d and 3. As with the embodiment shown in FIGS. 1–3, the main access door 31 of this embodiment is similar (or identical) to the main access door shown in FIG. 2, the difference being that the main access door 31 shown in FIG. 7 allows for the entire removal of cassette 43 whereas main access door 31 in FIG. 2 merely exposes the cassette shelves 24a, b, c, d and e containing the individual compartments 27a, b, c, d and e.

Figure 8:
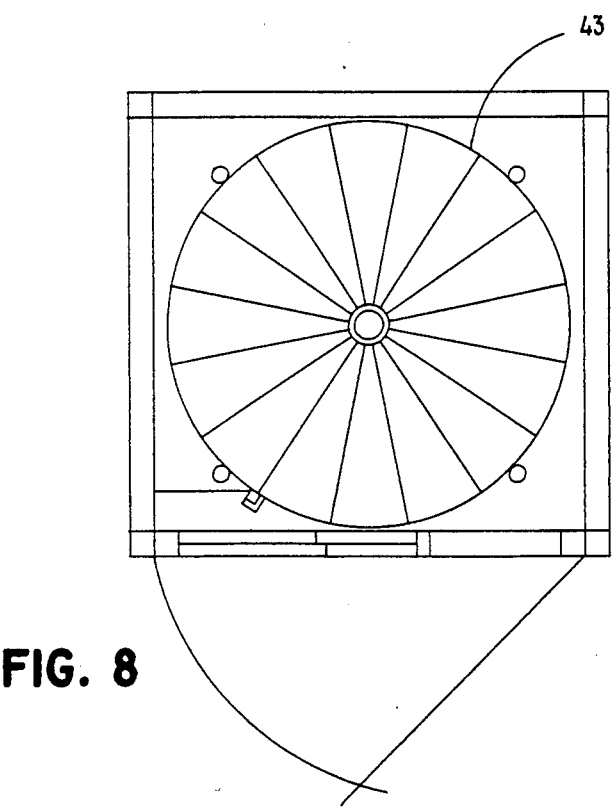
FIG. 8 is a top view of FIG. 6 showing the contours of the invention and the main access door both in the open and closed positions.
Figure 15:
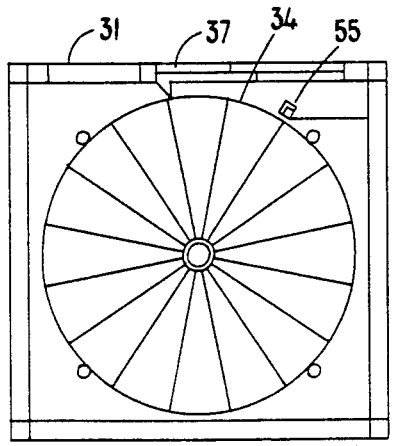
FIG. 15 is a top view of FIG. 6 with the cassette locking mechanisms in place.

FIGS. 8 and 15 are top views of FIG. 6 showing the removable cassette 43 in position and the main access door 31 closed. As with both the first embodiment of FIGS. 1-3 and the second embodiment of FIG. 6–8, the garment dispensing and depositing apparatus can be readily located in easily accessible areas occupying minimal space. The compartments 27a, b, c, d and e are secured in that the only way garments can be removed is by use of the card reader 33 and individual user access doors 37a, b, c, d and e. Similarly, this embodiment could be connected to a central computer which would allow access the microprocessors of the individual machines to monitor and control user access.

Alternatively, the embodiment shown in FIGS. 6-8 may house a permanent cassette 43 wherein main user access door can be opened and the cassette 43 loaded (or unloaded) without removal and replacement of the cassette 43. Such an embodiment would not be mounted on swivel wheels 29 as shown in FIG. 6. This may be advantageous to use in low use areas of a given facility.

Figure 9:
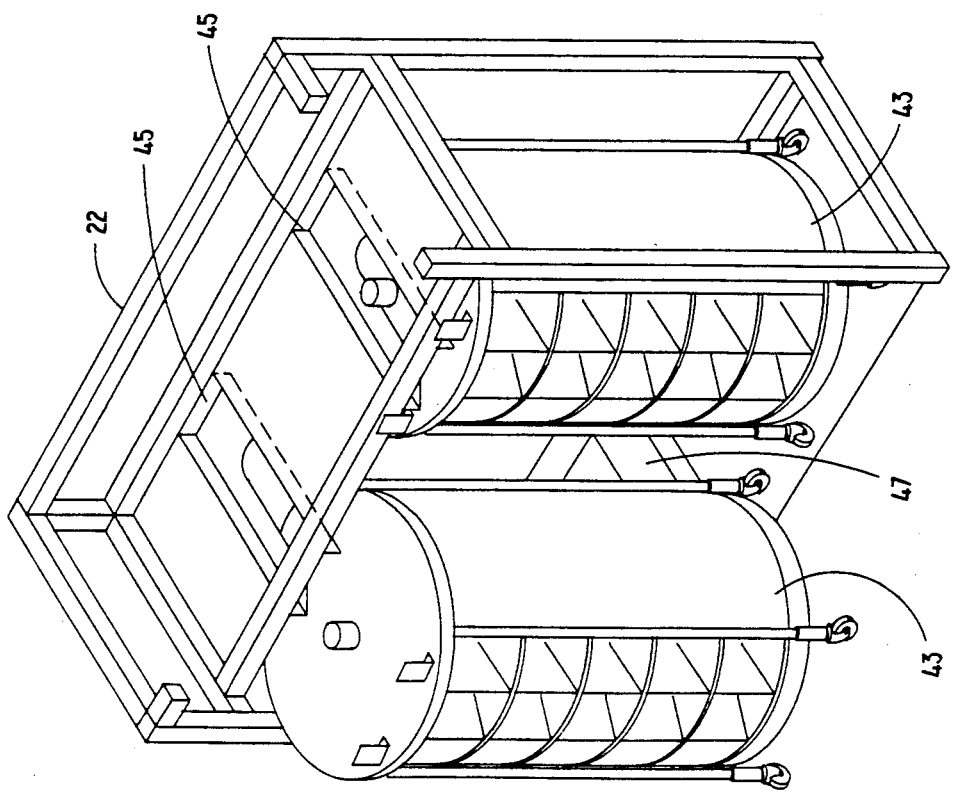
FIG. 9 is a plan view partially in section of a third embodiment of the present invention showing an inventory control system for returning and dispensing garments to authorized users with increased capacity for dispensing and/or receiving materials.
Figure 11:
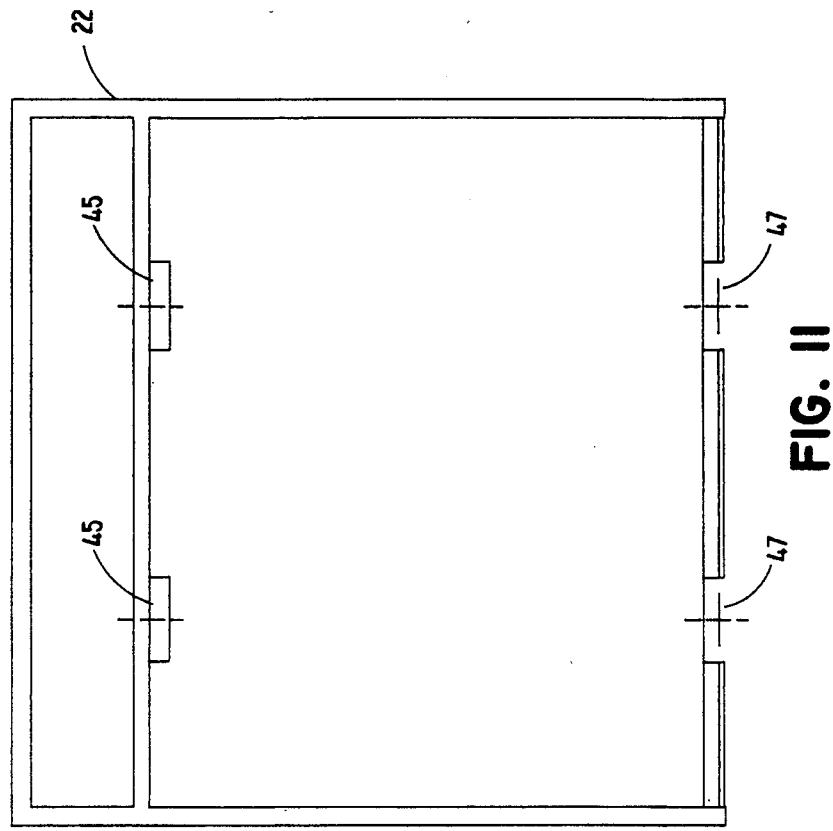
FIG. 11 is a front view of FIG. 9 with the main access doors removed showing both upper and lower cassette guides.
Figure 10:
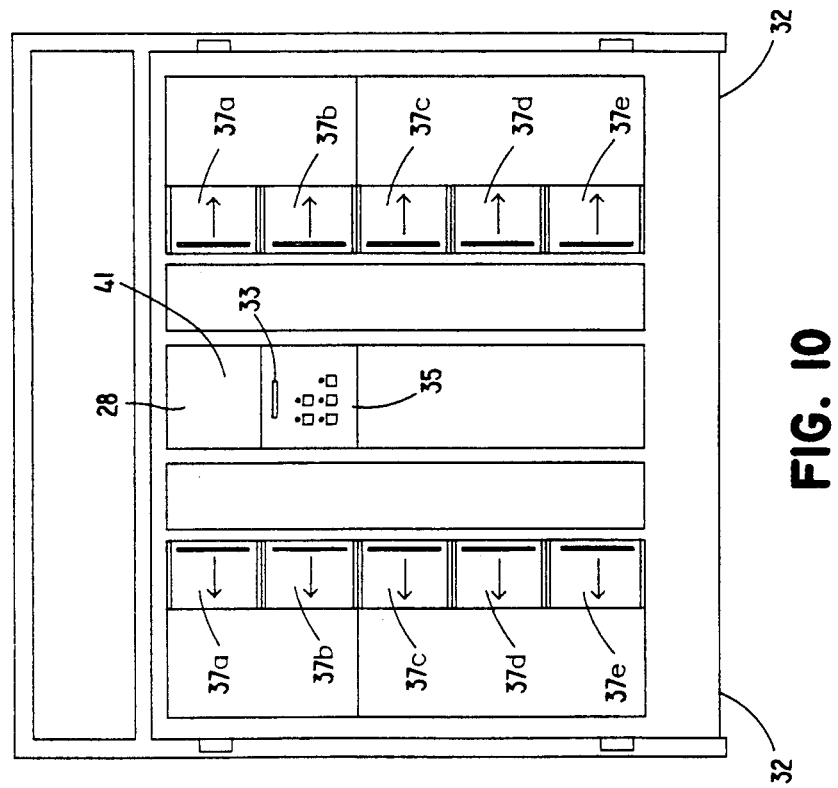
FIG. 10 is a front view of FIG. 9 showing that portion of the apparatus designed for user-interface and replacement or removal of materials.

Referring now to FIG. 9, there is shown a third embodiment of the present invention for increasing the capacity of a specific garment inventory control unit. The inventory dispensing unit shown in FIG. 9 preferably contains, but is not limited to, two cassettes. Similar to the second embodiment shown in FIGS. 6–8, there is a rigid frame 22 having both upper and lower guide channels for accepting two or more removable cassettes 43 simultaneously. The cassettes can be similar to those described in the second embodiment and shown in FIGS. 6–8.

In the embodiment shown in FIGS. 9–14, there are two main access doors 32 have individual access doors 37a, b, c, d and e on either side of a user interface panel 41. As with the previous embodiments shown in FIGS. 1–3 and 6–8, there is provided a single magnetic card reader 33 and a series of menu selection displays 35. A user inserts his magnetic card, requests a specific garment, and is instructed by the user interface panel 41 to open a specific user access door 37a, b, c, d and e and obtain the desired garment from a specific compartment 27a, b, c, d and e.

Figure 13:
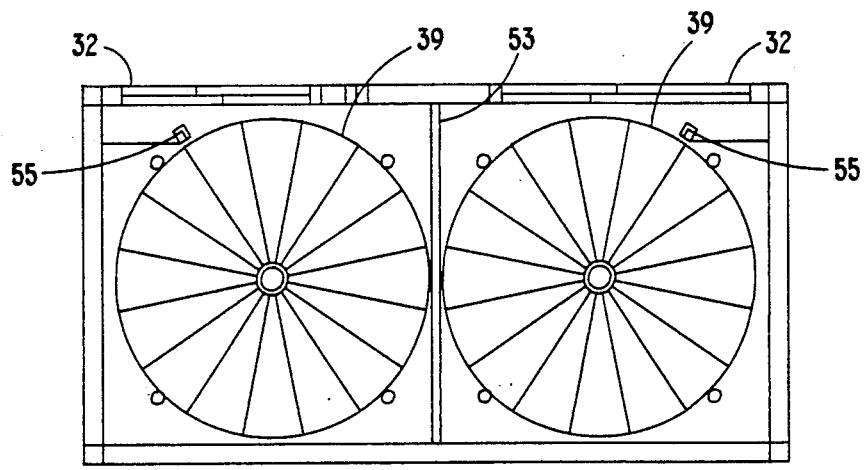
FIG. 13 is a top view of FIG. 9 showing two cassettes in place, divided by a central partition, for an inventory control apparatus.

In one embodiment, the dual cassette inventory control machine allows for twice the capacity of either of the embodiments shown in FIG. 1 and/or FIG. 6. In addition, and as shown in FIG. 13, a partition 53 can be inserted between the individual cassettes 43 providing two sanitarily separate compartments. The inventory control machine can then receive a soiled garment in one cassette 39 and dispense a clean garment machines throughout the facility. If a particular facility operates more than one machine, each machine could be connected by modem to a central registration computer in the hotel lobby thereby monitoring the user's access to various machines and tallying up the debits and credits to be applied when the guest checks out. Or, alternatively, each machine could be completely self-contained with no external communication means.

In the case of a hotel, the unit may be located close to the swimming pool and/or guest quarters whereas in the case of some amusement parks, the control apparatus, for dispensing and depositing uniforms for costumes that are worn on a daily basis in compliance with a specific theme park or theme park ride, could be located in a changing room accessible to employees. Depending on the type of facility, several removable cassettes could be acquired and rotated between the cleaning room, the pressing room and the inventory control machines located throughout the facility.

Figure 17:
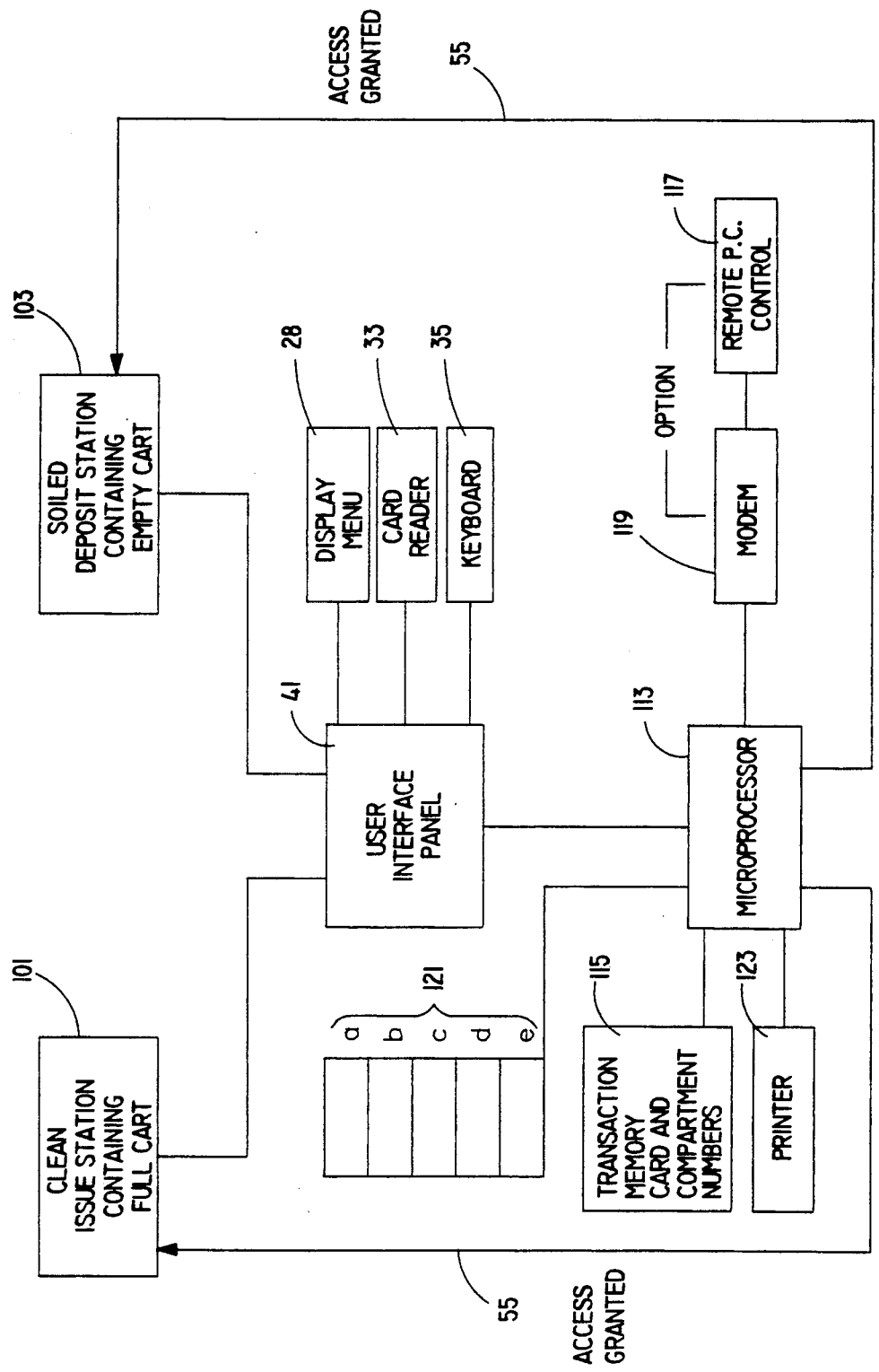
FIG. 17 is a flow diagram of the steps to an individual apparatus shown in FIGS. 1–8, 15 and 16.
Figure 18:
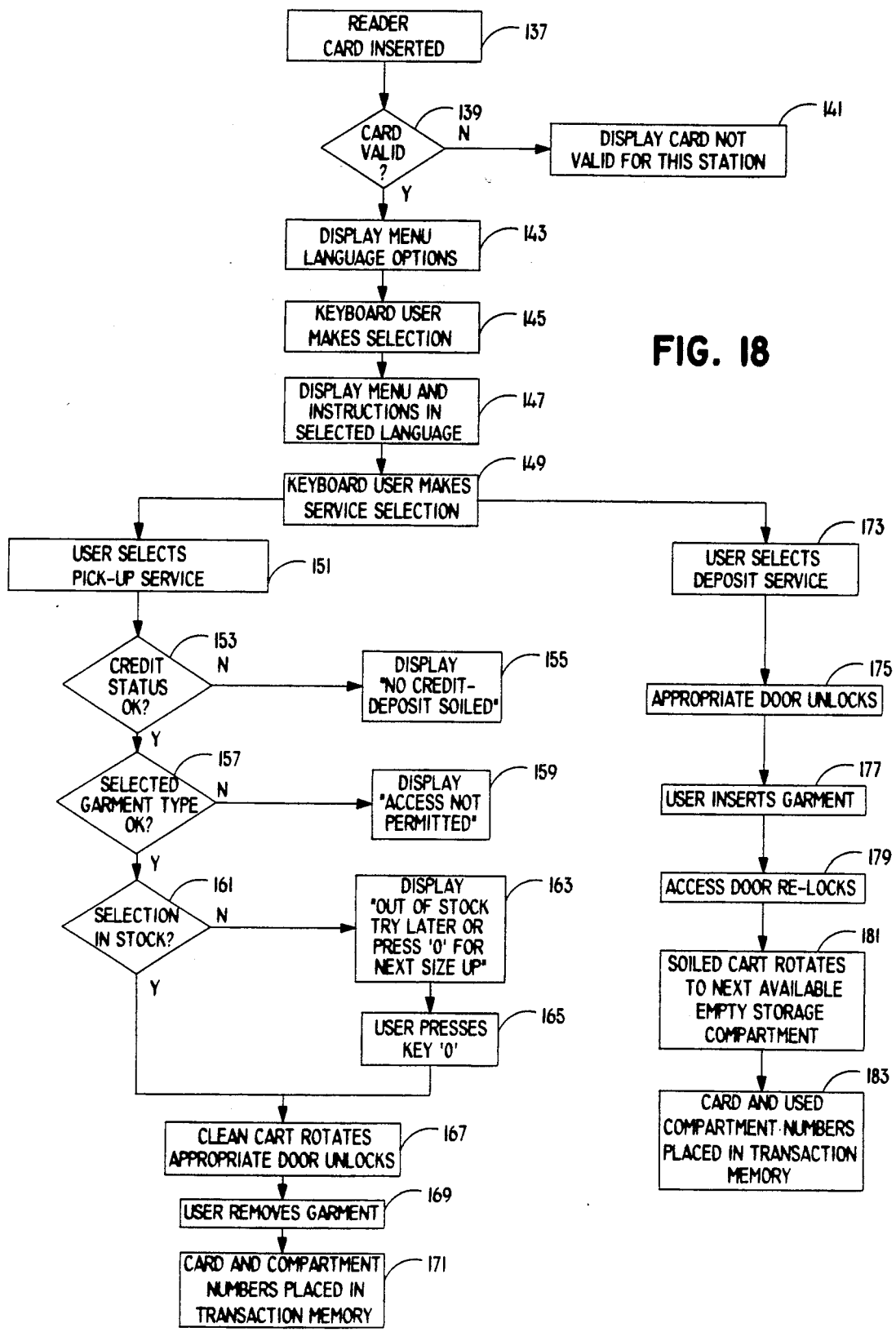
FIG. 18 is a flow chart for the apparatus shown in FIGS. 1–8, 15 and 16, relating to the apparatus control system.

Referring now to FIGS. 17 and 18, a user wishing to access the controlled dispensing apparatus as shown in FIGS. 1-3 and 6-8 would follow a series of steps as shown. FIG. 17 illustrates the control circuit for enabling access and maintaining user account data of the inventory control apparatus. FIG. 18 illustrates the operation of the circuit shown in FIG. 17 in response to the user or in other words software steps. Assuming, that for purposes of the apparatus and FIG. 17, there is a clean issue station 101 containing a cart again similar to that shown in FIGS. 1 or 6, with clean garments and there is a soiled garment deposit station 103 containing an empty cart similar to that shown in FIGS. 1 and 6. The two carts could be side by side or in locations of a given facility remote from one another. Through a user-interface panel 41, the user is presented with a display menu 28 (which could be, for example, an LCD display), a card reader 33 (or other indicia indicating mechanism for validating access to the from the other cassette 39. Alternatively, the unit, with (FIG. 13) or without (FIG. 14) a partition can be used to double the capacity of a machine for either dispensing or receiving garments.

Figure 12:
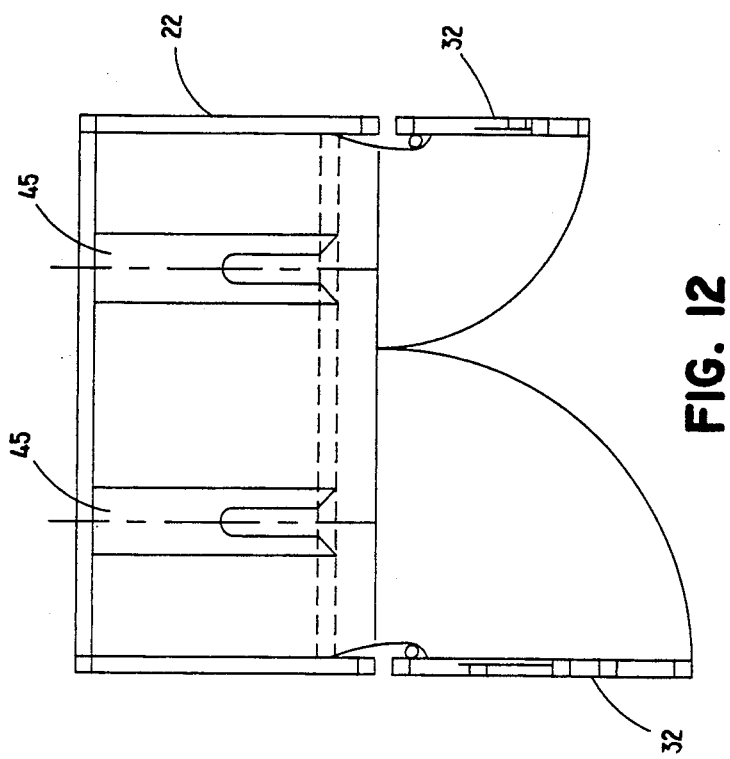
FIG. 12 is a top view of FIGS. 9 and 10 showing the main access doors in their open and closed positions.
Figure 14:
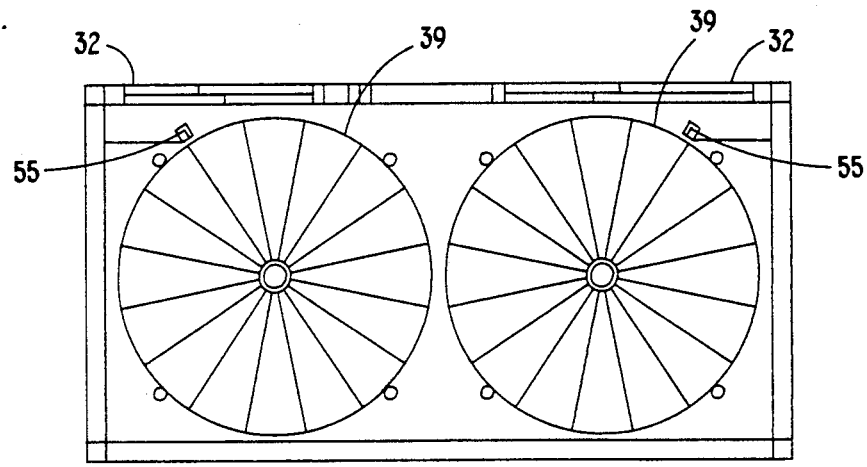
FIG. 14 is a top view of FIG. 9 showing two cassettes in place, sharing a common chamber, for an inventory control apparatus.

Depending on the use of the machine, the computer control circuitry of the machine shown in FIGS. 13 and 14 would differ somewhat. In FIG. 12 or 13 an individual user would be directed to either of two cassettes 39 containing a specific garment of the user's choice to be received or, alternatively, a specific compartment to deposit the garment.

Where the apparatus is to both receive and dispense garments, a user would be directed to a specific compartment of a specific cassette 39 containing the garment of the user's choice on one side of the apparatus and then be directed to a specific compartment on a different cassette of the same apparatus for depositing a soiled garment on the other side. Because of the partition 53, the machine shown in FIG. 13 can contain both soiled and clean garments.

Inventory dispensing apparatuses as shown in FIGS. 1, 6 and 9 can be used in a variety of environments including, but not limited to, hotels or other facilities which handle towels or other materials including robes and uniforms used by guests or employees. A user would access the machine through a magnetic card reader as described above, which could be for example his credit card, and obtain the desired garment. This transaction would be monitored either by the individual machine or by a central processing center. If the user failed to redeposit the garment either in the same or like apparatus, the user would be billed accordingly.

Alternatively, a card could be issued to the guest at check in and subsequently used to access various inventory dispensing inventory control system) and a key board 35 (or a series of buttons) in order that the user may interface with a microprocessor 113. Microprocessor 113 is preferably programmed with a read only memory (ROM) identifying the individual compartments 27a, b, c, d and e on the individual shelves 24a, b, c, d and e of cassette 39. In response to a user entering an identification number through keyboard 111 the microprocessor 113 will determine from the transaction memory 115 if there are credits sufficient to receive a new garment. Upon validation of the user, a signal is sent from the microprocessor to an appropriate solenoid of a specific shelf 24a,b,c,d, or e allowing access to that compartment. In addition, microprocessor 113 will update the a transaction memory 115 such that once a user has been validated and has been given access to a given compartment 27a, b, c, d and e, the microprocessor will contain in its read and right (RAM) memory 115 the specific user transaction and debit his account accordingly. If, as would be the case in most facilities, there are more than one inventory control apparatus per facility, the microprocessor 113 must be programmed for a certain apparatus in a certain area. Accordingly, the apparatuses would be connected to a remote PC 117 via a modem 119 and/or data cable (not shown) wherein all inventory control apparatuses could be controlled by a central computer.

Via the modem, each users account can be updated on a periodic basis to enable him to obtain additional garments. Further, users no longer authorized can have their accounts frozen via a remote PC and modem.

Finally, microprocessor 113 would be connected to a series of micro-switches 121a, b, c, d and e, each micro-switch sensor monitoring an individual user access door 37a, b, c, d and e. Each micro-switch 63 would correspond to a solenoid 55 on each of the shelves 24a, b, c, d and e in a single cassette 39. Each micro-switch 63 would be positioned behind door 37 such that when a user pulling on handle 59 (after locking solenoid 55 has retracted solenoid pin 56), opens user access door 37, thereby partially rotating cassette 39 until user access door 37 closes micro switch 63. When micro-switch 63 closes solenoid 55 will release solenoid locking pin 56 to again catch on a subsequent cassette latch pin 57.

Finally, microprocessor 113 could be connected to a printer 123 in order that the microprocessor memory 115 can be printed to evaluate the various users who have accessed a specific apparatus.

Depending on the inventory control apparatus, the user will either extract a clean garment signified from clean station 101 or deposit a soiled garment as signified by station 103. If removing a garment the user will receive a debit and if replacing a garment the user will receive a credit in the transaction memory 115.

Referring to FIG. 18, a user wishing to use an inventory dispensing apparatus, as shown in FIGS. 1-3 and 6-8, would first insert his card 137. Card 137 would go through a validation decision process 139 and if, for some reason, the card is invalid, the apparatus software would notify the user and the user would be denied access 141, and informed briefly as to the problem, such as his card being invalid at this particular station. If, on the other hand, the card has been validated, the software user presents the user with a display 143 and 147 informing the user to make a selection using a keyboard 145 and 149. The user is then instructed to extract or deposit a garment. If the dispensing service is selected, control block 151 is selected, and if the deposit service is selected, control block 173 is selected.

Once a user's card has passed through the first validation process, his card is again screened 153 to determine if the user has available credits to receive a garment. If no credits are available, he will be instructed to deposit a soiled garment 155 or check with the central control operator. Assuming proper credits are available, he will be asked to select a specific garment. The garment would be stored on shelves 24a, b, c, d and e according to, for example, size. This could include extra large, large, medium, small and extra small. If a particular garment is not available, the software will notify the user that access is denied and the user will be instructed accordingly 159.

If the user's selection is valid 161, the user will be instructed that either the machine is out of stock 163 and that the user should try later, or press a menu button to select a different garment 165. Once a user has successfully accomplished the above steps, he is then directed to a compartment 27a, b, c, d or e, on a shelf 24a, b, c, d or e, wherein an appropriate door 167 is unlocked and the garment 169 can be removed. Accordingly, the microprocessor will place this information in memory 115 wherein the central control computer can access this information and update the user's card with respect to credits and debits.

Similarly, as with selecting a clean garment, if a user is replacing a soiled garment, he selects the depositing service 173 wherein the appropriate door unlocks 175. The user then inserts the soiled garment 177 and the access door is returned by a spring 60 and relocked 179. A compartment is then filled and the apparatus is ready for the next user 181. Finally, the transaction is recorded in memory 183 to be retrieved by the central computer.

Figure 19:
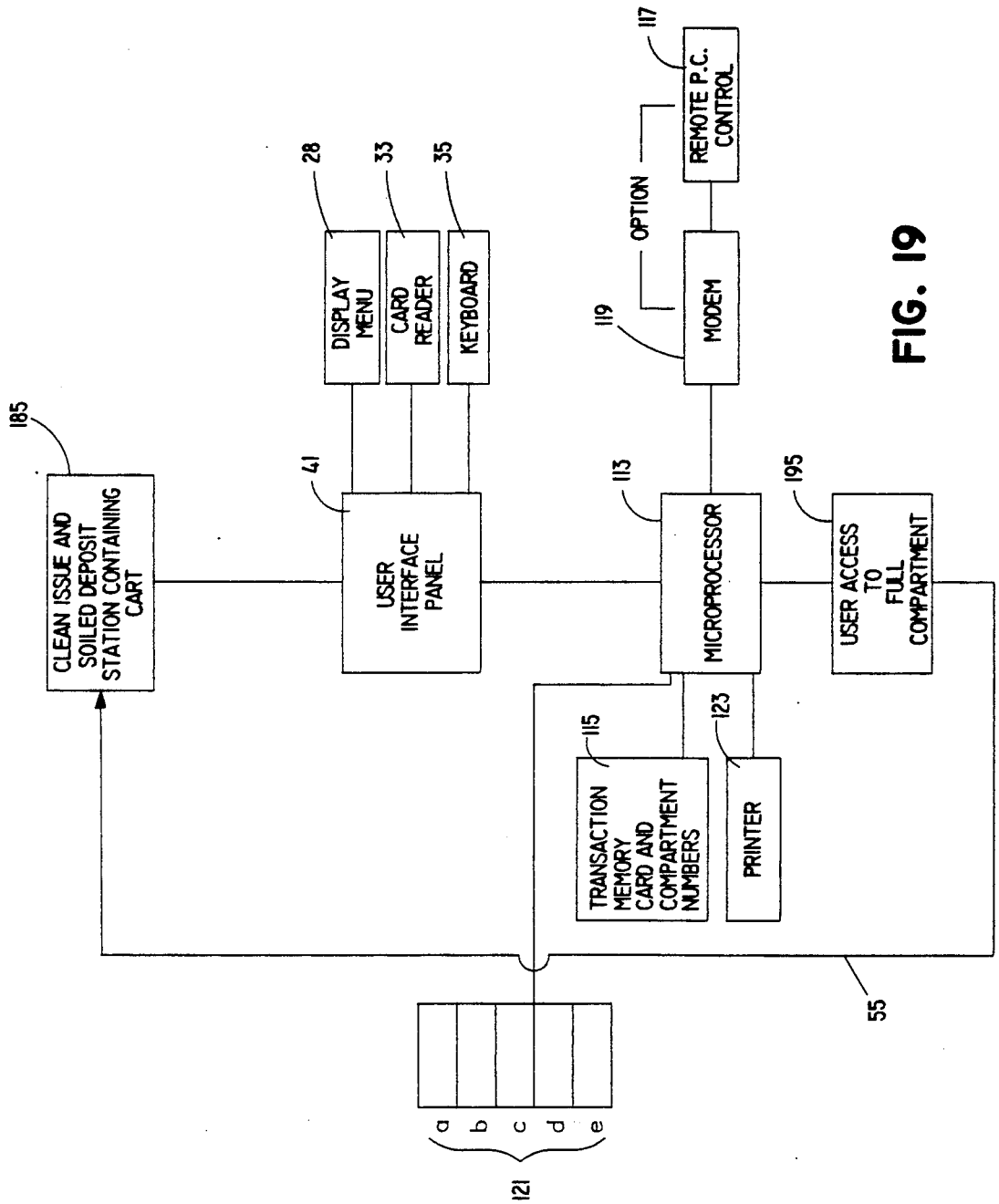
FIG. 19 is a flow diagram of the steps to an individual apparatus shown in FIGS. 9–14.

In FIGS. 17 and 18, it is assumed that there is a need for sanitary control and that the inventory control apparatus for issuing a clean garment is different than the inventory control apparatus for receiving a soiled garment. However, this does not have to be the case. It may be advantageous to have an inventory control apparatus which both distributes clean garments and receives soiled garments (FIG. 19). For example, where towels or robes are distributed in a hotel environment, it is not necessary to require that the stations be separate for sanitary reasons. On the other hand, in a hospital environment, it would be a disadvantage to have one inventory control apparatus containing both soiled and clean garments; assumably, there could be a problem with cross infection that would be unacceptable.

If a single apparatus is to be both a dispensing and receiving apparatus 185, a user would again be confronted with a user-interface panel 41 containing a display menu 28, a card reader 33 and a keyboard 193. The microprocessor 113 would be connected by modem 119 to a remote PC 117 and there would be a transaction memory 115 and a printer 123. The difference between the apparatus of FIGS. 17 and 19 is that microprocessor 113 would monitor the full and empty compartments. If a user is removing a garment, he would be directed to a shelf and compartment where a clean garment is contained 35. He could then remove the clean garment 197. Depending on the particular garment's use, the user could replace the garment 199 at the same time or return the soiled garment at a later time. When the user returns the soiled garment at a later time the microprocessor will know which compartments contain clean garments, which compartments contain soiled garments and which compartments are empty. Accordingly, the user would be directed to the appropriate compartment; all transactions would be recorded.

Figure 20:
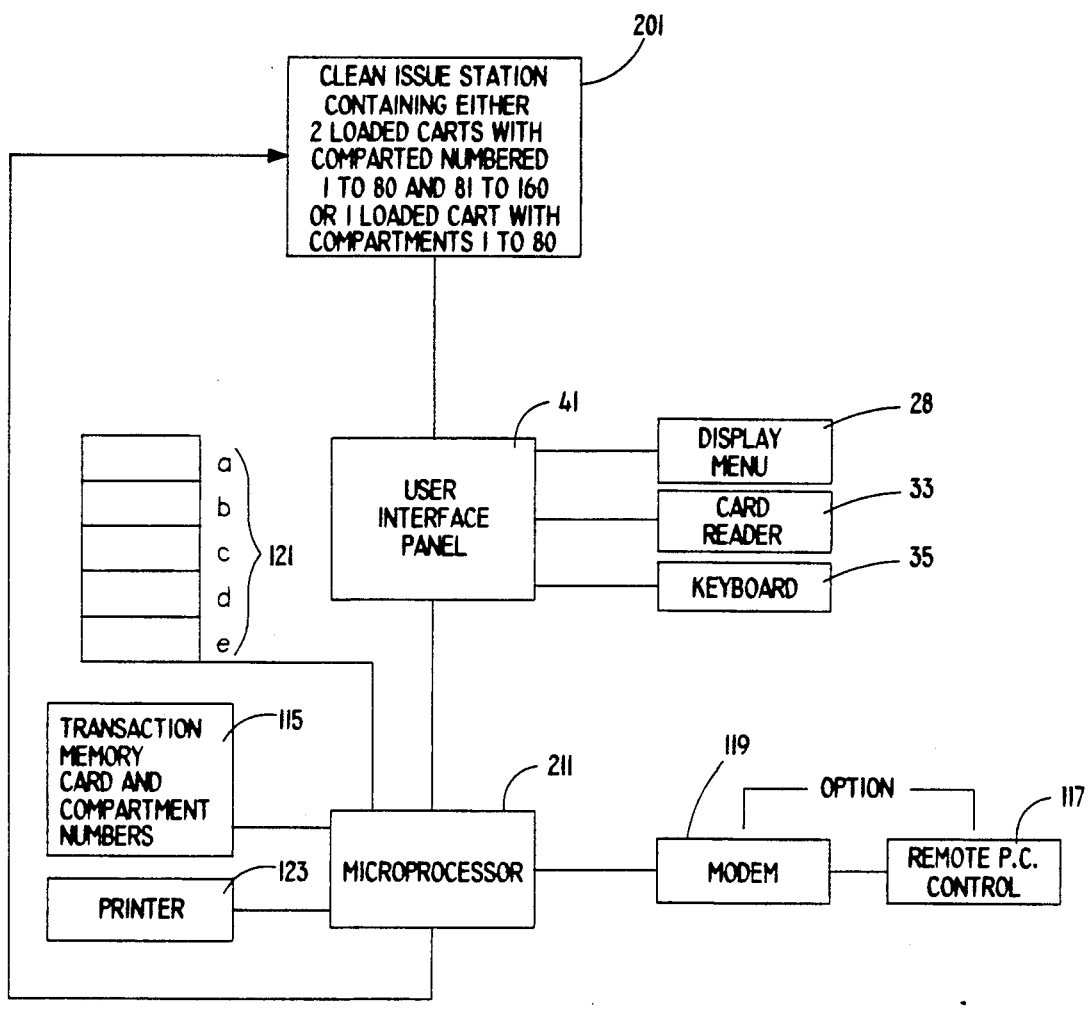
FIG. 20 is a flow diagram of the steps to an individual apparatus shown in FIGS. 9–14.
Figure 21:
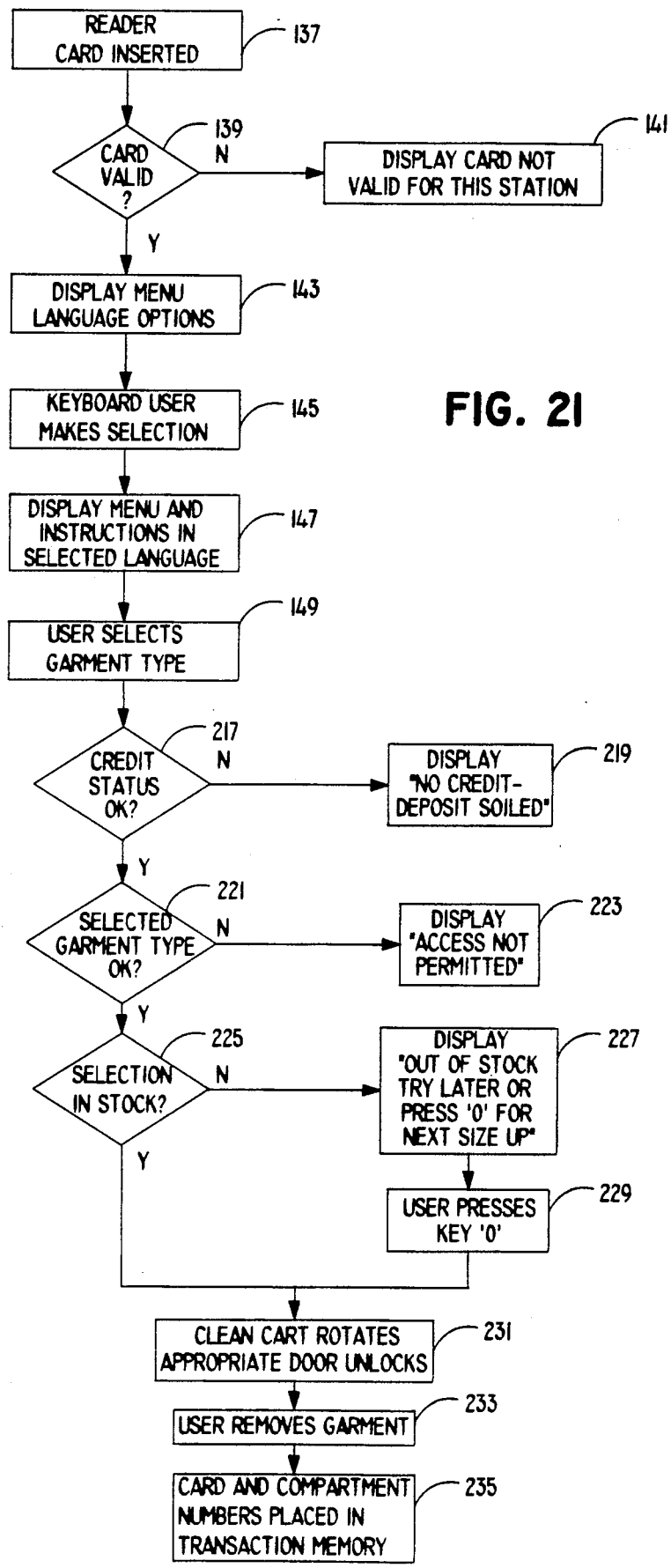
FIG. 21 is a flow chart for the apparatus shown in FIGS. 9–14 relating to the apparatus control system.

Referring now to FIGS. 20 and 21 there is shown the control circuit (FIG. 20) which represents the control system of an inventory control apparatus as shown in FIGS. 9-14. Similarly, FIG. 21 is the software flow diagram showing what a user would encounter in using the apparatus. In addition, because a number of apparatuses, could be connected by modem to a remote computer control system, it is also conceivable to place two single apparatuses specifically those shown in FIGS. 1-3 or 6-8 side by side, wherein an individual user could place a soiled garment in one apparatus and receive a credit, and remove a clean garment from a separate apparatus thereby receiving a debit. This would apply to both the single cassette apparatuses of FIG. 1 and 6 and the dual cassette apparatus of FIG. 9. However, in the preferred embodiment it would be considered more convenient to use a dual cassette cart as shown in FIG. 9.

The apparatus 201 would consist of a single display menu 28, a single card reader 33, a single selection key board 35 and a user interface panel 41. There is a similarity between the interface panel 41 of this embodiment and those discussed earlier however, the microprocessor 211 would have to be capable of distinguishing that two cassettes are in the same apparatus, specifically that one side of the apparatus has numbered compartments from 1 to 80 and the opposite side of the apparatus has numbered compartments from 81 to 160. Similarly, and as shown in FIGS. 13 and 14, a single dual cassette apparatus could be used as either a depositing or distributing station having a total of 160 compartments. Or, it could be used for both receiving soiled garments on one side and clean garments on the other side.

As discussed above, microprocessor 211 will contain microswitch sensors 121 a,b,c,d and e, and a transaction memory for recording a user transaction. A modem 119 will be provided for connecting microprocessor 41 to a remote PC 117. Once the user's card has been validated the user will be directed, by way of the user-interface panel 41, to a specific compartment to return a soiled garment and receive a credit and then to a second compartment to retrieve a garment and thereby receive a debit.

Referring now to FIG. 21, a user would go through a series of steps similar to those discussed in FIGS. 18 above, wherein the user would insert his card 137, the card would be validated 139 and if invalidate 141 the user would be notified through user interface panel 41. Once the card has been validated, the user would be presented (on display 143 and 147) selections to be made on keyboard 145. Once these steps have been completed, a determination will be made as to whether credits 217 are available. If a new garment is to be removed and no credits are available, the user will be notified through user interface panel 41, specifically, that no credits are available and that he must deposit a soiled garment or check with an attendant 219. If credits are available, the user will select a garment 221. If the garment is not available, the user will be notified and his access denied 223. The user will be instructed accordingly, specifically that he should try again at a later time or press another selection to allow access to a different garment 229. Once it is determined that the garment chosen is in stock, the user will be instructed to a specific compartment 27a, b, c, d or e, the locking solenoid 55 will release solenoid locking pin 56 and the user can remove a garment 233 as discussed previously. The transaction will then be placed in the microprocessor's memory 115.

Figure 22A:
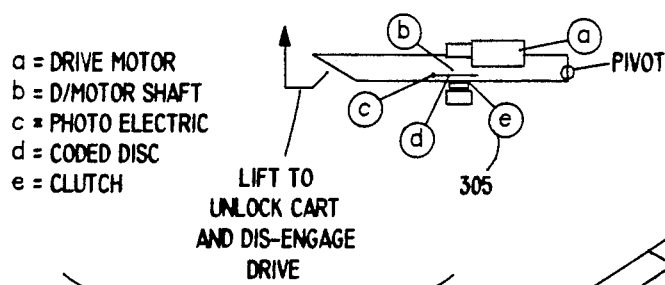
FIG. 22A is a clutch for positioning the shelves of FIG. 22.
Figure 22:
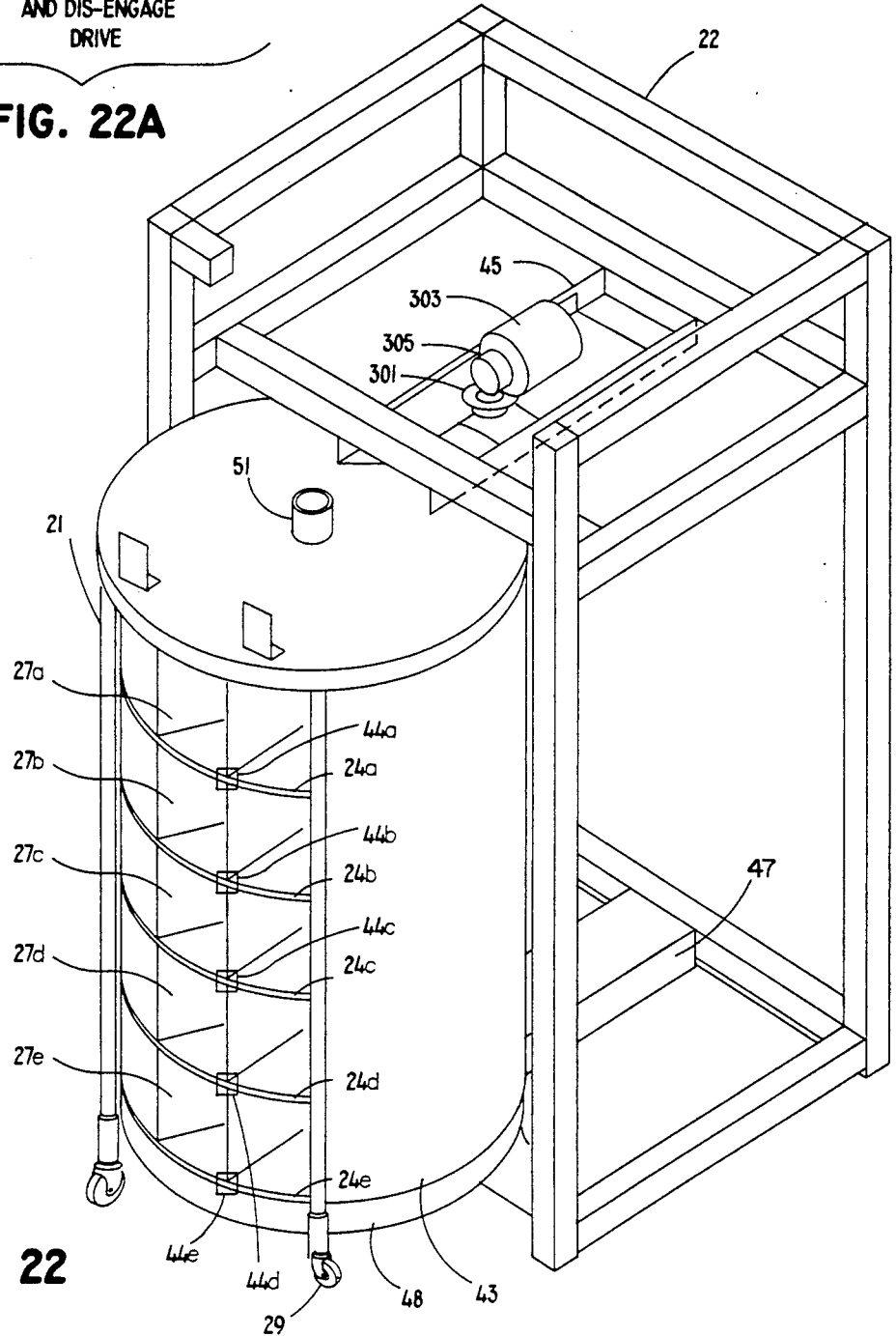
FIG. 22 is a plan view partially in section showing a fourth embodiment of the present invention for dispensing/receiving materials to and from authorized users.
Figure 23:
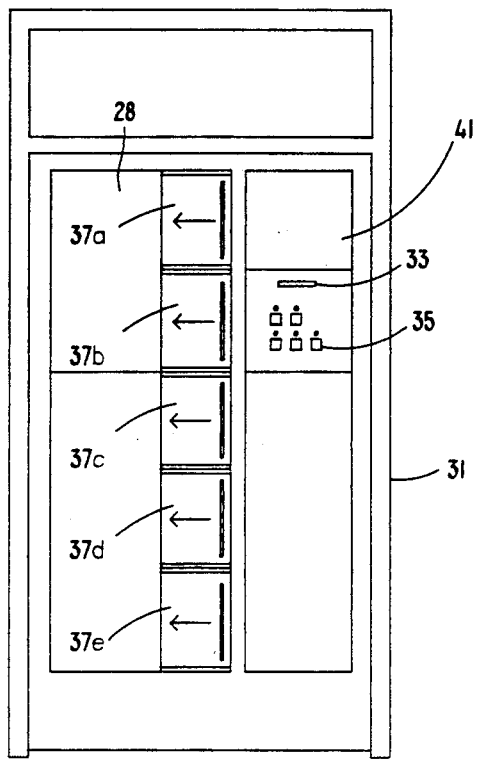
FIG. 23 is a front view of FIG. 22 showing that portion of the apparatus designed for user interface and removal and/or placement of materials.
Figure 24:
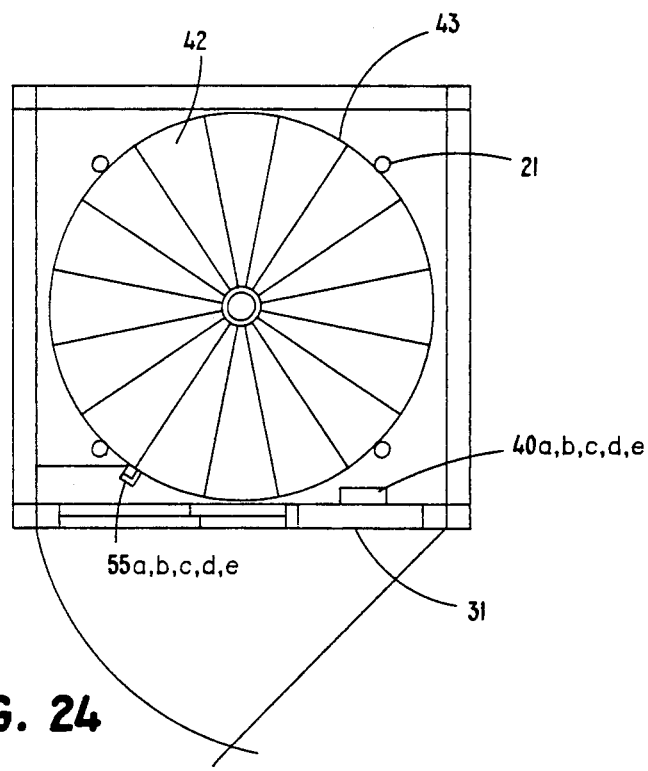
FIG. 24 is a top view of FIG. 22 showing the contours of the invention's main access door both in the open and closed positions.

Shown in FIG. 22 there is a fourth automated embodiment of the present invention. This automated embodiment can be applied to both the single cassette apparatus of FIGS. 6-8 or the dual cassette apparatus of FIGS. 9-12. Referring to FIG. 22 there is shown the automated version comprising the semi-permanent frame 22 wherein enclosures are attached to frame 22 for providing a secure environment for containing a removable cassette 43. As with the previous embodiments, removable cassette 43 has a upper cassette guide pin 51 and lower cassette guide pin (not shown) corresponding to upper guide 45 and lower guide 45 respectively of frame 22. The removable cassette 43 contains a series of shelves 24a, b, c, d and e, with individual compartments on each shelf 27a, b, c, d and e securely housed in a frame 21 and mounted on swivel wheels 29. The shelves 24a, b, c, d and e are securely attached to one another wherein the individual shelves 24a, b, c, d or e can not be rotated separate from one another. When removable cassette 43 is inserted into stationary frame 22, upper cassette guide pin 51 mates with a drive gear or pin 301 for rotating cassette guide pin 51. Accordingly, cassette guide pin 51 is attached to the shelves 24a, b, c, d and e wherein upon rotation of cassette guide pin 51, shelves 24a, b, c, d and e rotate as well.

Mounted on the top side of upper guide pin 45 is an electric motor 303. Motor 303 is connected to a transmission or clutch mechanism 305 wherein upon receiving appropriate signals from microprocessor 113, motor 303 will drive cassette shelves 24a, b, c, d and e in a direction according to the user's selection. Clutch 305 further shown in expanded FIG. 22A will stop rotation of motor 303 when the appropriate shelf 24a, b, c, d or e with compartment 27a, b, c, d or e has arrived at the appropriate user access door 37a, b, c, d or e. The user will then be instructed through user interface panel 41 to remove or replace a garment. A series of sensors 40a, b, c, d or e, communicate with the various compartments 27a, b, c, d or e, and transmit the appropriate signal to the microprocessor. The microprocessor then rotates the cassette with motor 303 and the clutch 305 stops the compartment to correspond with the appropriate sensor 40.

In the previous embodiments it was necessary for the user to pull open user access door 37a, b, c, d or e, thereby rotating an individual shelf 24a, b, c, d or e to place the appropriate compartment 27a, b, c, d or e in position for obtaining a garment. The automated version of the present invention does not require the user to perform rotation of the individual shelves 24a, b, c, d or e. Instead, individual user access doors 37a, b, c, d or e are provided with locking solenoids that secure the door in position and closed. Once the cassette has been rotated into position the appropriate solenoid will release and the user is then able to open user access door 37a, b, c, d or e and obtain the garment or replace a soiled garment.

Similar to the previous embodiments, main access door 31 houses the individual user access doors 37a, b, c, d or e and the electronics associated with user interface.

Figure 25A:
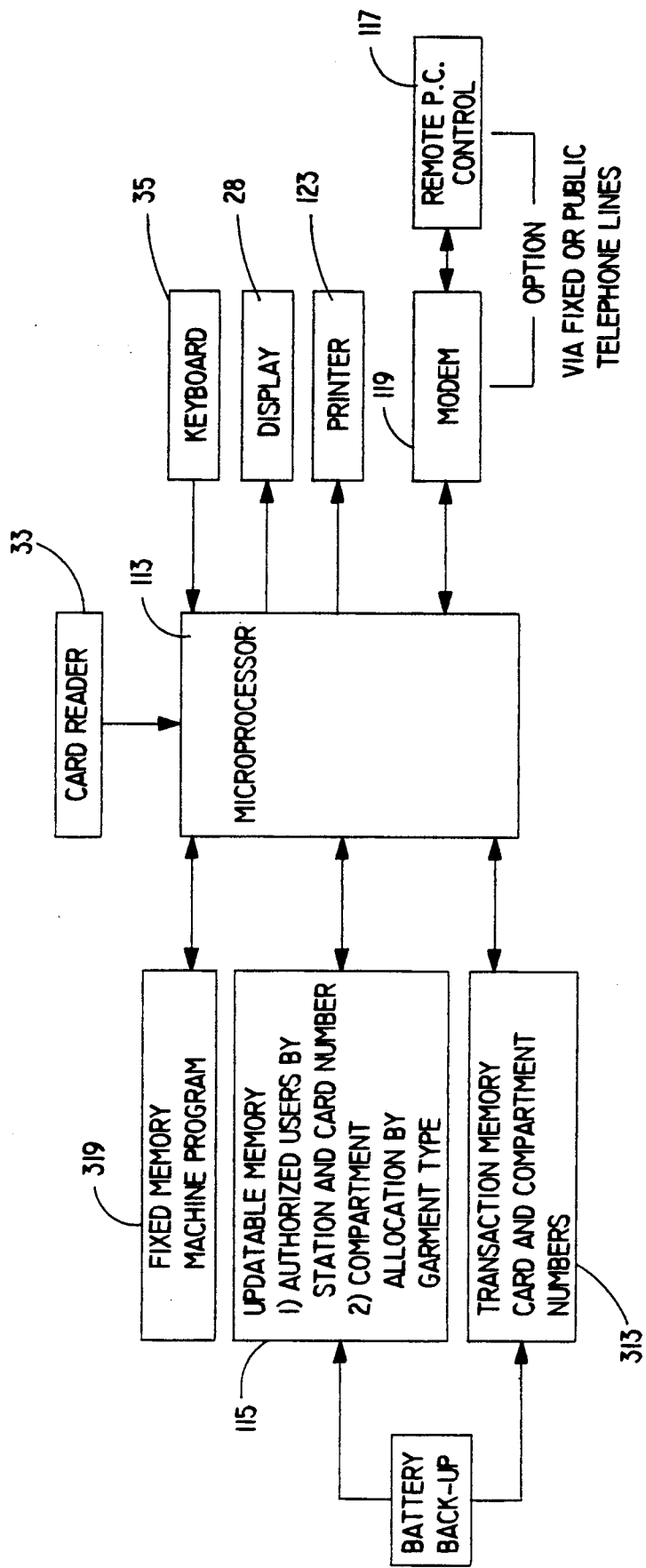
FIG. 25A is a block diagram of the control circuit for the apparatus of FIG. 24.
Figure 25B:
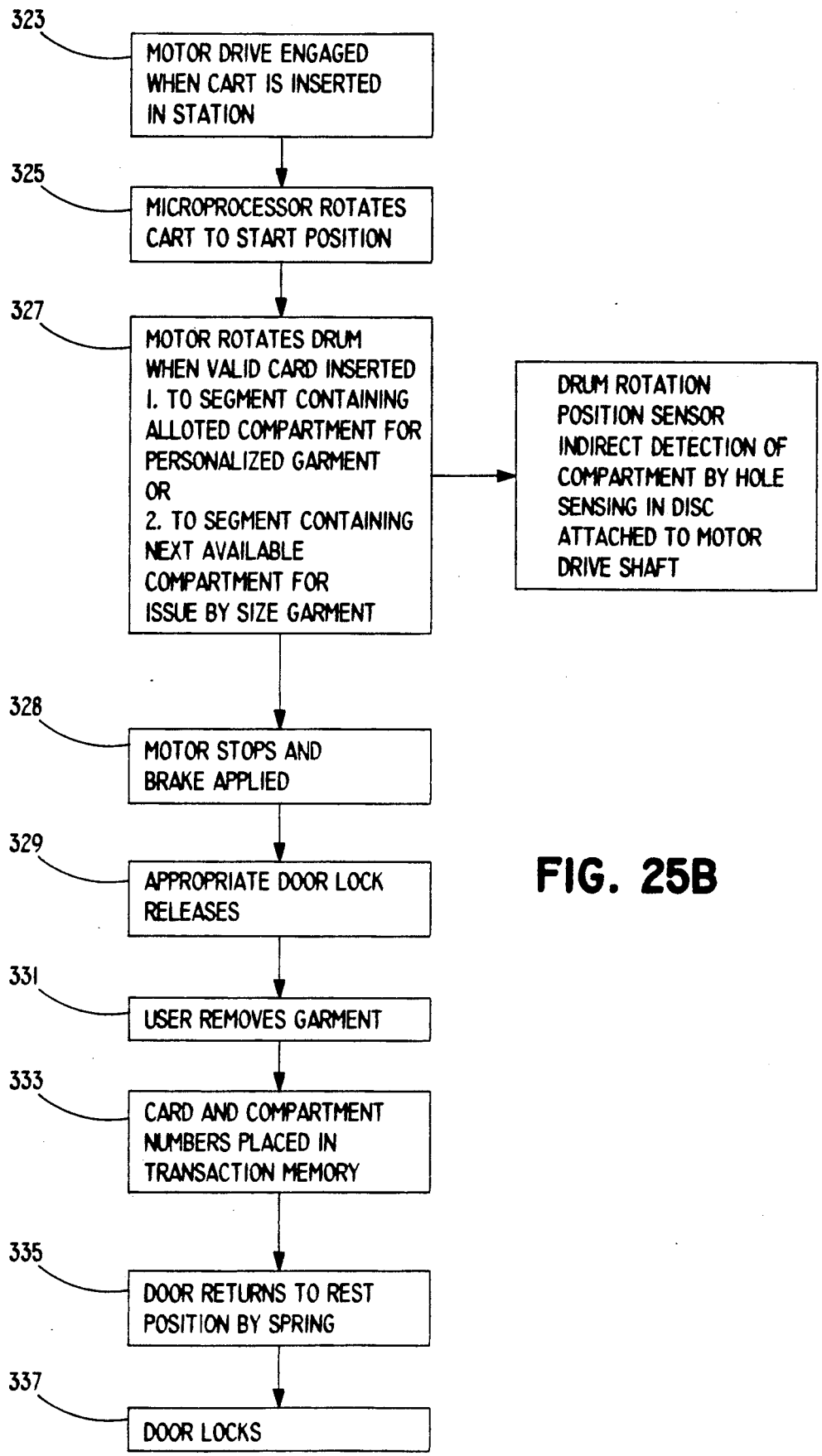
FIG. 25B is a flow chart for the apparatus shown in FIGS. 22–24 relating to the apparatus control system.

Referring to FIG. 25A and B, a user inserts his card into card reader 33, illustrated in FIG. 25A as shown in flow diagram block 33. As in previous embodiments, the microprocessor will be attached to a display 28, a printer 123 and to a remote PC 117 via modem 119. Microprocessor 113 Will begin an interface through keyboard 35 with a particular user. The microprocessor will similarly have a read only memory 313 containing information pertaining to individual shelves and compartments on a specific cassette. In addition the microprocessor will have a read and write memory 115 for containing information pertaining to a particular transaction. Much of the hardware content resembles previous embodiments other than microprocessor 113 also communicates with compartment sensors 40 to monitor rotation and stopping of the cassette.

Once the user's card has been validated, the user has requested, through keyboard 35, a specific garment and the microprocessor has determined that the specific garment requested is available, the microprocessor will then obtain the identity of the compartment containing the selected garment from ROM 319 and will engage motor 303 to drive the cassette to the specific compartment on a specific shelf 323. This may be accomplished by first rotating the cassette to a start position 325 and then by rotating the cassette and using clutch 305 to stop the cassette at a specific segment or compartment 327. In order that the clutch 305 stop the cassette at a specific position, the sensors on the periphery of the cassette will communicate with microprocessor 113 in order that microprocessor 113 can command the clutch/brake means to engage or disengage accordingly to stop rotation of the cassette in a specific position. Once the cassette has stopped the appropriate solenoid identified from the ROM 35 data controlling user access door 37a, b, c, d or e will be released 329 and the user can remove the appropriate garment 331. Once the transaction has been completed the information will be stored in memory 333 of microprocessor 113 and the user access door 37a, b, c, d or e will be returned by a spring to its original position and locked by solenoid 335, 337.

Similarly, the automated version as described above, could be applied to the apparatus shown in FIGS. 9-12 wherein the two upper guides 45 house individual motors for cooperating with upper cassette guide pin 51. Further, it is not necessary to limit the number of cassettes to those shown in FIGS. 9, 10, 11 or 12. Depending upon the particular facility and the intended use of a particular apparatus, more than two cassettes could be used and operated or controlled by a single microprocessor wherein the user would be directed to a user access door corresponding to his garment once the microprocessor had rotated the appropriate compartment 27 into position.

Figure 26:
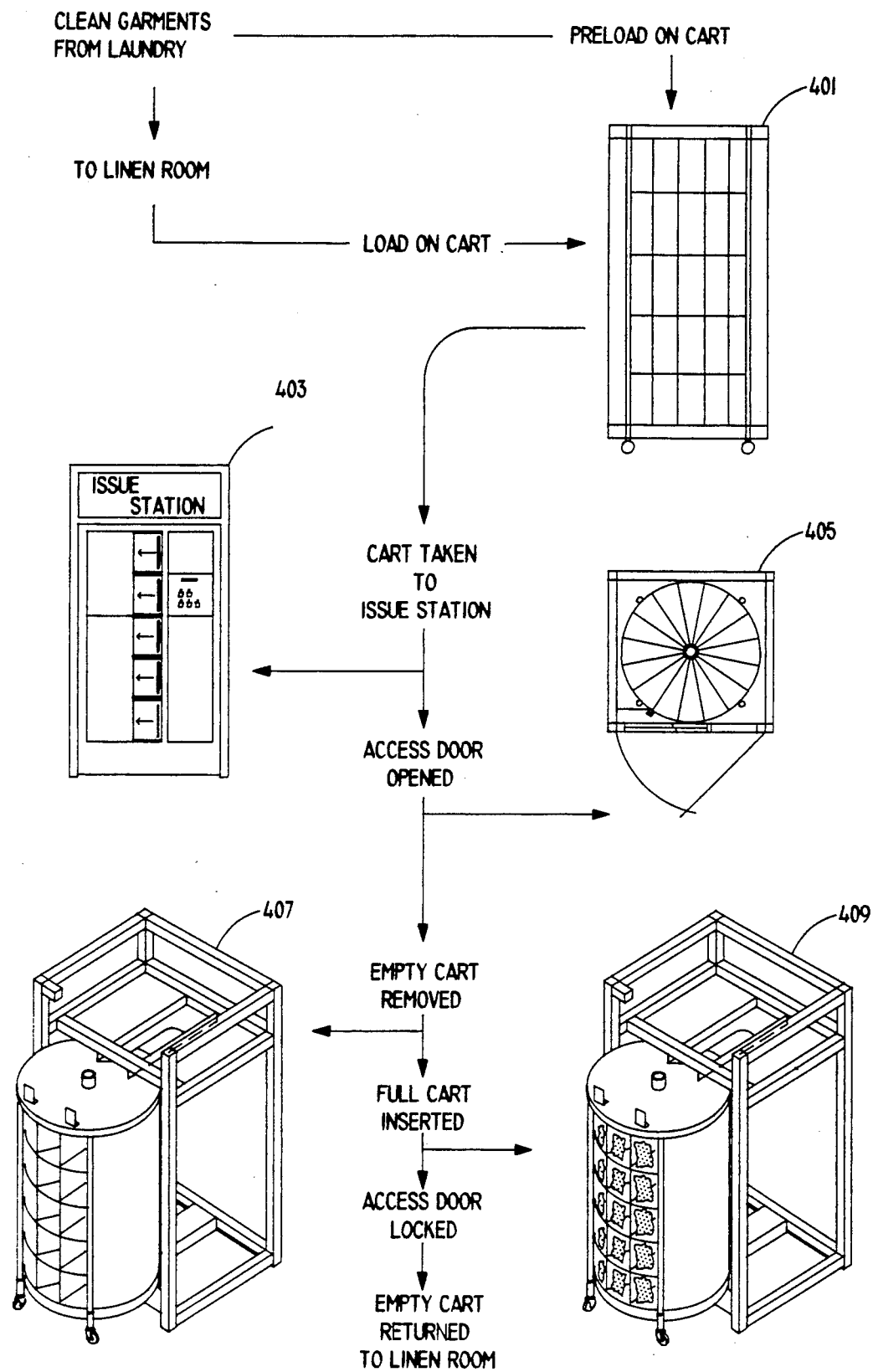
FIG. 26 is a flow diagram of how cassettes may be relocated or interchanged in a given facility.

The control systems as described above and comprising the present invention can be operated as shown in FIG. 26. Garments (new or cleaned) can be loaded onto a specific cassette (either a complete station as shown in FIGS. 1-3 or a removable cassette as shown in FIGS. 6-16). That cassettes can be taken to a issue station and exchanged for a removable cassette completely or partially used or, as is shown in FIGS. 1, 2 and 3, the entire cart can be replaced.

In FIG. 26, there is shown a series of stages common to the use of the present invention. For purposes of illustration, the cycle begins with a preloaded cart 401 which may contain clean garments from the laundry or new garments. Once the cart 401 is loaded, the cart is taken to a station 403. This station may simply be a designated area using one of the carts shown in FIG. 1-3 or it may be a semi-permanent station comprising a receiving station as shown in FIG. 4-6. The is either position or loaded into the receiving station depending. If the station is semi-permanent, the main access door 31 will be unlocked with a conventional lock and key arrangement. The old card will be removed 407 and the new cart installed 409. Subsequently, the empty or partially empty cart will be taken back to the laundry or preparation room and the cycle repeats itself in that clean or new garments are placed on the cart and, if necessary, the cart is sterilized.

We claim:

1. Apparatus for controlling the dissemination of garments comprising:

first and second rotatable cassettes, each cassette including a plurality of shelf segments and supported in a respective frame, said first cassette serving as a container for clean garments, and said second cassette serving as a depository for soiled garments;

first and second enclosures for enclosing said cassettes, each having a door covering an opening to a shelf segment of each of said cassettes;

first and second actuator operated door locks for maintaining said doors closed until a respective actuating signal is received;

electronic circuit means for supplying first and second actuating signals to said first and second actuator operated door locks comprising:

a card reader for reading a user access card;

a memory for storing user account data;

a menu display means for displaying instructions to a user;

a keyboard entry means to enter garment selection data and garment deposit data;

a microprocessor connected to said card reader, said menu display means and said memory, said microprocessor being programmed to:

provide instructions to said menu display means, instructing said user to enter garment selection data or garment deposit data on said keyboard entry means;

read said keyboard entry means to obtain said garment selection or deposit data;

compare said garment selection data with account data in said memory identified by an account number on said user card;

supplying an actuator signal to said first actuator operated door lock if selection data is received which agrees with said account data, and supplying an actuation signal to said second actuator operated door lock if said user enters garment deposit data;

updating said account data with data which indicates whether a garment has been selected from said first rotatable cassette or deposited in said second rotatable cassette.

2. The apparatus of claim 1 wherein said first and second cassettes include means for rotating a different shelf segment into alignment with a respective opening in said enclosures.

3. The apparatus of claim 2 wherein said first and second cassettes shelf segments are rotated in response to a respective door opening and closing.

4. The apparatus of claim 2 wherein said cassettes are mounted on rollers, permitting said cassette to be rolled into and out of engagement with said frames when said enclosures are removed.

5. The apparatus of claim 4, wherein said cassettes include a guide pin which is received in a guide of said frame.

6. The apparatus of claim 1 wherein, said individual doors covering each of said exposed shelf segments are individually coupled to rotate said shelves to expose the next adjacent segment of a respective shelf.

7. The apparatus of claim 1 wherein said frame and enclosure are supported on wheels for movement.

* * * * *